106. COMPOSITIONS, COATING OR PLASTIC.

79

845,681

UNITED STATES PATENT OFFICE.

ALEXANDER BERNSTEIN, OF BERLIN, GERMANY.

PROCESS OF MAKING GLUE SUBSTITUTES.

No. 845,681. Specification of Letters Patent. Patented Feb. 26, 1907.

Application filed September 10, 1906. Serial No. 334,034.

*To all whom it may concern:*

Be it known that I, ALEXANDER BERNSTEIN, chemist, a subject of the German Emperor, residing at Berlin, Germany, Magdeburgerstrasse 9, have invented certain new and useful Improvements in Processes of Making Glue Substitutes; and I do hereby declare the following to be a full, clear, and exact description of the invention, such as will enable others skilled in the art to which it appertains to make and use the same.

This invention relates to chemical combinations of casein which have the binding power of glue and may be used in all such cases in which ordinary glue has been applied. For this purpose the casein, which may be in a wet or dry state, is mixed with water and a certain amount of an alkali or an alkaline salt is added, so as to dissolve the casein in a well-known manner. Thereafter the chlorid of a metal of the alkaline earths or the magnesium group is added—for example, chlorid of calcium, barium, or magnesium. At the same time an addition of a soluble silicate is made, such as silicate of sodium or potassium.

The chlorids mentioned before—for example, chlorid of magnesium—have a decomposing effect on the soluble silicates, such as silicate of sodium. In this special case the chlorin will combine with the sodium, forming common salt, and a silicate of magnesium is produced. This latter substance is insoluble in water, and if no casein were present the silicate of magnesia would be precipitated in solid pieces. However, the presence of the dissolved casein, which is a glutinous substance, has the effect of preventing this precipitation, and the silicate of magnesia remains suspended in a slimy state, thereby adding to the binding power of the product.

The process may be carried out in the following manner: To four hundred cubic centimeters of water one hundred grams of dry casein are added and brought into solution in a well-known manner by the addition of twelve grams of soda. A solution is made containing ten grams of crystalline magnesium chlorid in ninety cubic centimeters of water, and this is added to the casein solution under constant stirring and keeping the temperature of the mixture at about 40° centigrade. Upon the addition of sixty cubic centimeters of the ordinary commercial silicate of sodium the decomposition of the latter will take place, as described above, and a compound of great binding power is formed.

The silicate can be added before the chlorid, or both may be added together to the casein solution.

If the finished product is deprived of water, the dry casein-glue will swell in cold water and dissolve in warm water in the same way as ordinary glue.

All such additions as are now made to ordinary glue for various technical purposes may be made in the same manner to the new product here described.

I am aware that a mixture of casein with water-glass and lime has been used. In my process the decomposition of water-glass is effected by a salt of a metal—for example, magnesium chlorid in solution—and a mixture of the alkaline solution of casein with the decomposed water-glass forms a glue substitute which is stable in its physical condition, while the mixtures of casein with water-glass and lime must be used in a fresh state, as they soon begin to harden.

What I claim as my invention, and desire to secure by Letters Patent, is—

1. The process of making a substitute for glue, which consists in making an alkaline solution of casein, adding thereto a solution of chlorid of magnesium, and finally adding thereto silicate of soda, substantially as described.

2. The process of making a substitute for glue, which consists in dissolving dry casein in a solution containing soda dissolved in water, adding thereto a solution of chlorid of magnesium, and adding to the mixture sodium silicate, substantially as described.

In testimony whereof I affix my signature in presence of two witnesses.

ALEXANDER BERNSTEIN.

Witnesses:
WALTER SCHILL,
WILHELM DORME.

References:- Pick (German) 60,156, Ausgegeben Nov. 18, 1891 (87 Adhesives). Wittkowsky, 537,096, April 9, 1895 (English). Grosspietsch, (German) 132,895, Ausgegeben July 5, 1902 (do).